(12) United States Patent
Yasuda

(10) Patent No.: US 7,728,469 B2
(45) Date of Patent: Jun. 1, 2010

(54) MOTOR DRIVING APPARATUS

(75) Inventor: Hiromu Yasuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/209,131

(22) Filed: Sep. 11, 2008

(65) Prior Publication Data

US 2009/0072677 A1    Mar. 19, 2009

(30) Foreign Application Priority Data

Sep. 14, 2007 (JP) .............................. 2007-239305

(51) Int. Cl.
*H02K 15/02* (2006.01)
(52) U.S. Cl. ................. 310/68 B; 310/156.47; 310/49.35
(58) Field of Classification Search .............. 310/49 R, 310/68 B, 156.47, 49.19, 49.23, 49.25, 49.29, 310/49.31, 49.32, 49.34, 49.35, 49.37
See application file for complete search history.

(56) References Cited

U.S. PATENT DOCUMENTS

| | | | | |
|---|---|---|---|---|
| 4,286,184 A | * | 8/1981 | Kogler et al. | 310/67 R |
| 4,823,038 A | * | 4/1989 | Mizutani et al. | 310/257 |
| 5,034,642 A | | 7/1991 | Hoemann | |
| 5,773,908 A | * | 6/1998 | Stephens et al. | 310/254 |

FOREIGN PATENT DOCUMENTS

JP        5-176486        7/1993

* cited by examiner

*Primary Examiner*—Dang D Le
(74) *Attorney, Agent, or Firm*—Canon U.S.A., Inc. I.P. Division

(57) ABSTRACT

In a motor driving apparatus, an incline of boundary lines of magnetic poles with respect to a rotating shaft of a rotor and an incline in a movable direction of a magnetic detection unit with respect to the rotating shaft of the rotor are different.

8 Claims, 9 Drawing Sheets

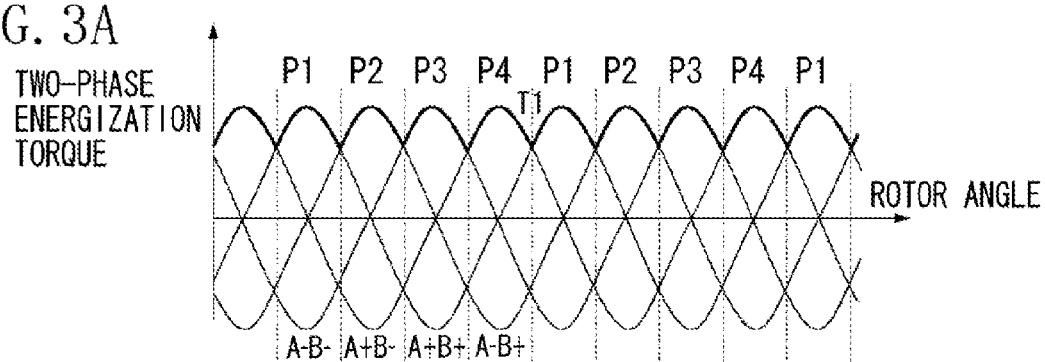
FIG. 3A TWO-PHASE ENERGIZATION TORQUE
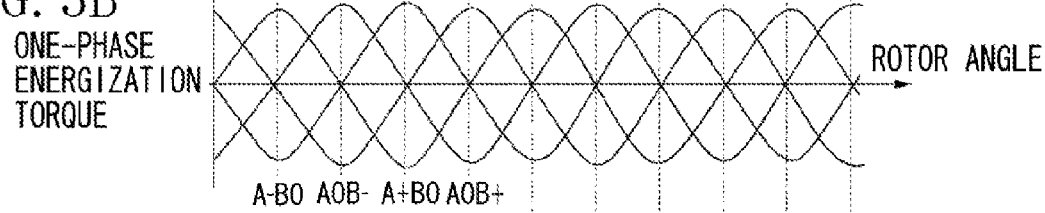
FIG. 3B ONE-PHASE ENERGIZATION TORQUE
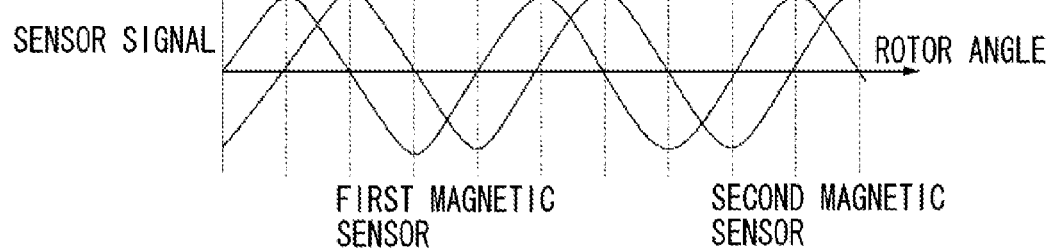
FIG. 3C SENSOR SIGNAL $\Delta\theta \times 2/n$ $\Delta x = R\sin(\Delta\theta \times 2/n)$ ized so that S poles and N poles alternate with each other, a first magnetic pole member configured to face a magnetized surface of the magnet and extend, a second magnetic pole member configured to face the magnetized surface of the magnet and extend, a first coil configured to excite the first magnetic pole member, a second coil configured to excite the second magnetic pole member, a position adjustment unit configured to arrange the first magnetic pole member and the second magnetic pole member with a predetermined phase, and a magnetic detection unit movably arranged on the position adjustment unit and configured to detect a magnetic field strength generated by the magnet, wherein an incline of boundary lines of the magnetic poles of the magnet with respect to a rotating shaft of the rotor and an incline in a movable direction of the magnetic detection unit with respect to the rotating shaft of the rotor are different.

MOTOR DRIVING APPARATUS

BACKGROUND OF THE INVENTION

1. Field of the Invention

The present invention relates to a motor driving apparatus which includes a position detection unit.

2. Description of the Related Art

A common control for a stepping motor is an "open-loop control" which does not have a feedback loop and is operated in synchronization with a command pulse. Such a control allows a digital positioning operation to be performed easily. Due to such characteristics, the open-loop control is widely used in home information appliances, such as cameras and optical disk devices, and office equipment, such as printers and projectors.

However, there is a problem that during high-speed rotation or when a load on the motor is large, a step-out phenomenon occurs in which the motor can no longer rotate following the command pulse.

To resolve this problem, a brushless DC motor in which a magnetic sensor is mounted on a stepping motor to switch energization according to the position of the rotor is known as a technique to prevent the step-out.

However, to efficiently drive the brushless DC motor, the magnetic sensor has to be mounted with precision. The reason for this is as follows.

FIG. 9 is a diagram illustrating a relationship between torque generated when a constant current flows through a coil and a rotor rotation angle.

When the coils of a motor are configured of two (A phase and B phase) coils, the current can flow in the two coils in the positive direction and the reverse direction, respectively. The torque, when positive energization is carried out in the A phase and in the B phase, is expressed as A+B+, and the torque, when reverse energization is carried out in the A phase and in the B phase, is expressed as A−B−.

Under such a condition, torque waveforms like that illustrated in FIG. 9 can be produced. FIG. 9 illustrates the relationship between the rotor angle and the torque generated in the motor based on the four energization patterns of A−B−, A+B−, A+B+, and A−B+.

All of these patterns are waveforms that have the same and a roughly sinusoidal shape, and have a 90° phase difference in terms of their electrical angle.

Here, the term "electrical angle" expresses one cycle of this sine wave as 360°. If a number of poles of the rotor is n, 1° of electrical angle corresponds to (2×actual angle/n).

To rotate the motor, the energization to the coil is successively switched to produce a torque waveform as illustrated by T1 of FIG. 9, whereby a high torque can be constantly obtained.

Timing for switching the energization to the coil is determined by a signal obtained from the magnetic sensor. Therefore, by mounting the magnetic sensor at an optimum position, the energization can be switched at the timing having the best efficiency.

However, if there is an error in the mounting position of the magnetic sensor, a torque waveform as illustrated by T2 of FIG. 9 is produced, whereby problems arise such as a decrease in motor efficiency and occurrence of noise.

Japanese Patent Application Laid-Open No. 5-176486 discusses a configuration which provides a rotor with a main magnetic field region capable of reducing cogging torque and a sensor magnetic field region which facilitates positioning of a magnetic sensor at a predetermined position. This configuration enables assembly of the apparatus with less mounting error in the magnetic sensor position while reducing the cogging torque.

Here, a case where a mounting error of the magnetic sensor is allowed to be at the electrical angle of ±Δθ° will now be considered. FIGS. 8A and 8B are diagrams illustrating the mounting error of the magnetic sensor. When a distance from a rotating shaft to the magnetic sensor is denoted by R (mm), and the number of poles of the magnet is denoted by n, as illustrated in FIGS. 8A and 8B, a mounting error Δx of ±R sin(Δθ×2/n) (mm) can be permitted in a case of a ±Δθ° angle error. Therefore, the smaller the diameter of the motor becomes, or the higher the number of poles is, the greater the precision that is required for mounting the magnetic sensor.

Recently, various devices which are mounted with a motor have been getting smaller and made with higher precision. Thus, a demand for the motor having a smaller diameter and a larger number of poles is increasing. As a result, higher precision is also required in the mounting of the magnetic sensor.

However, for the configuration discussed in Japanese Patent Application Laid-Open No. 5-176486, since the mounting precision of the magnetic sensor is the same as conventional sensors, there is a problem that when the magnetic sensor position is adjusted with high precision, assembly costs of the motor are increased.

SUMMARY OF THE INVENTION

The present invention is directed to a motor driving apparatus in which it is easy to finely adjust a mounting position of a magnetic sensor which reads a rotation position of a rotor.

According to an aspect of the present invention, a motor driving apparatus includes a rotatable rotor having a magnet that is divided into a plurality of segments along an outer peripheral surface and is magnet- Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A to 3C are diagrams illustrating a relationship among torque generated in a coil, a rotation angle of a rotor, and a sensor signal.

DETAILED DESCRIPTION OF THE EMBODIMENTS

Various exemplary embodiments, features, and aspects of the invention will be described in detail below with reference to the drawings.

First Exemplary Embodiment

Figure 1:
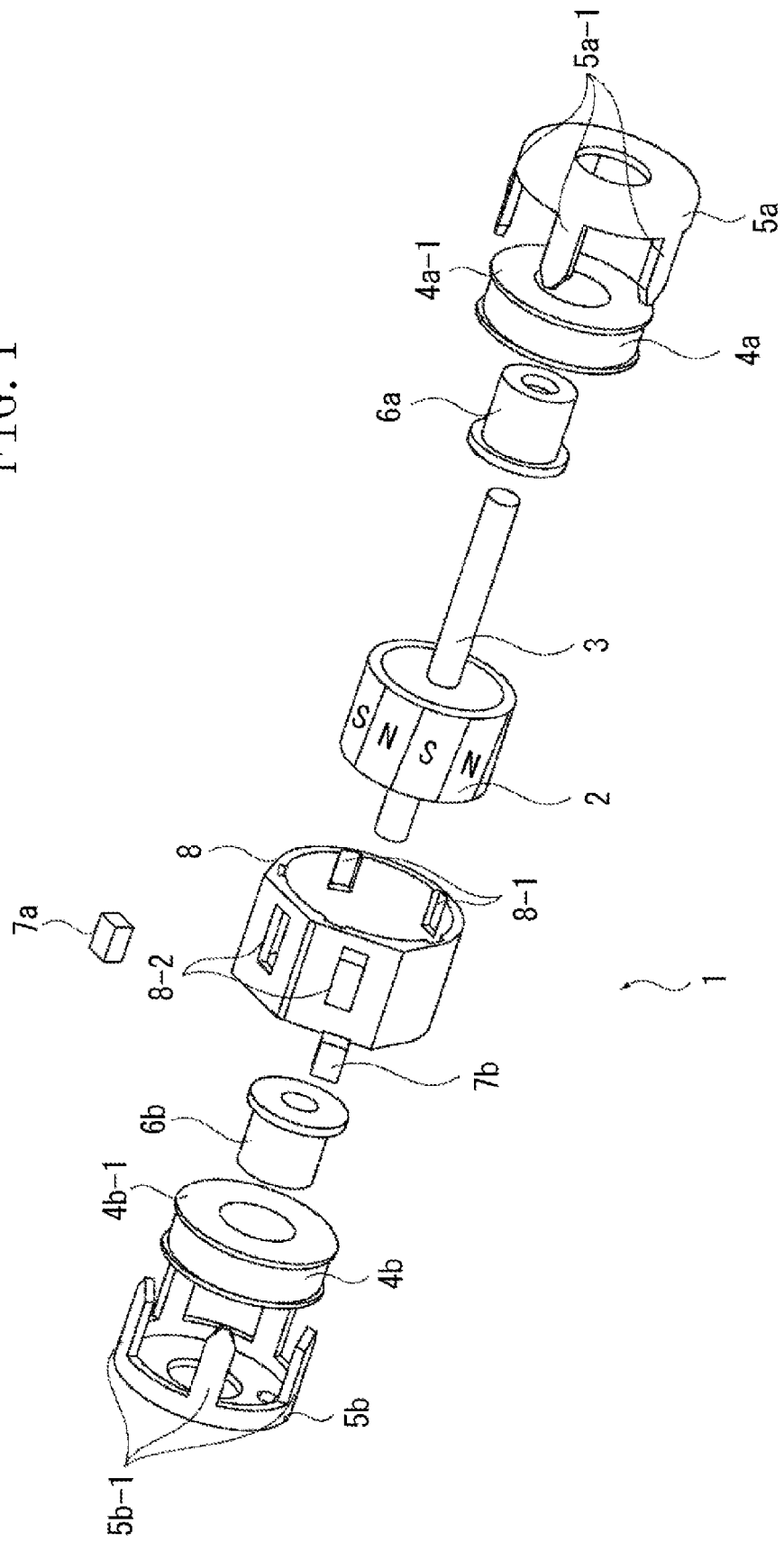
FIG. 1 is an exploded perspective view of a motor according to a first exemplary embodiment of the present invention.
Figure 2:
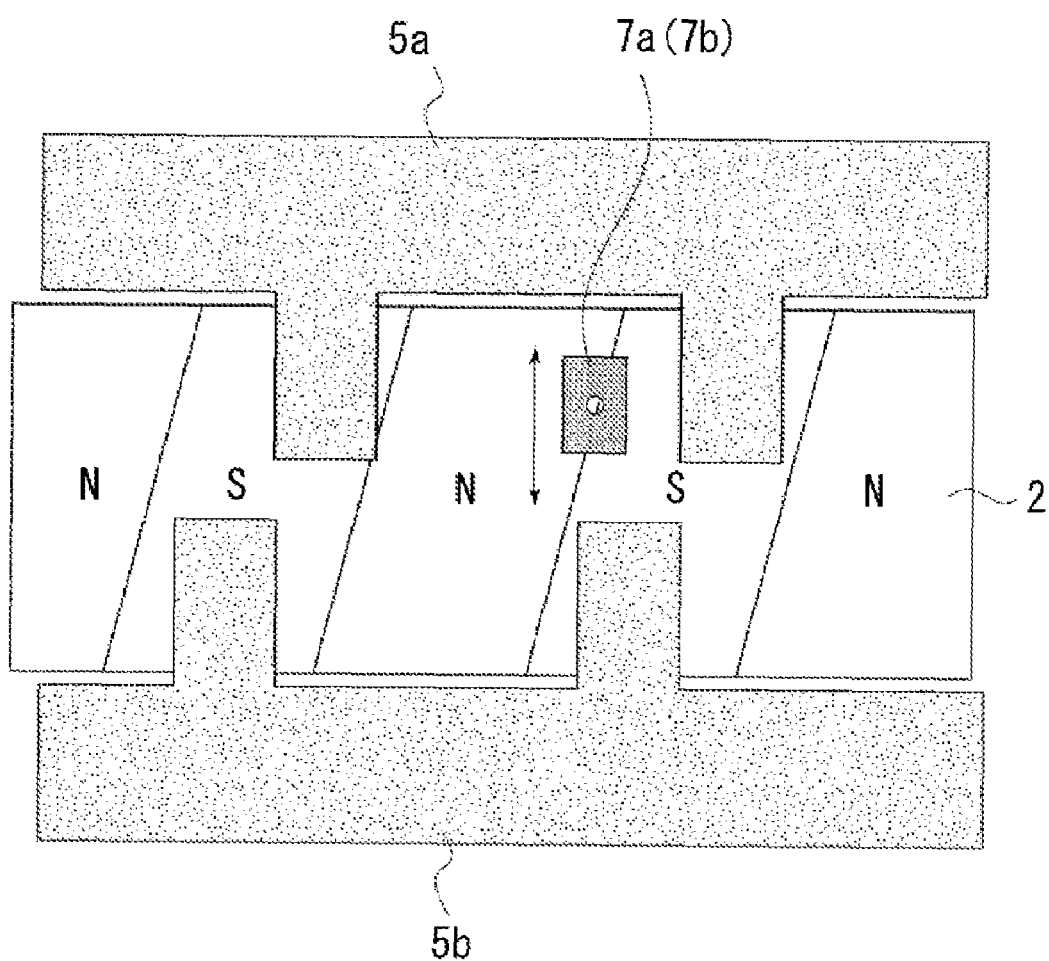
FIG. 2 is a schematic diagram illustrating a positional relationship among a magnet, yokes, and a magnetic sensor in the first exemplary embodiment of the present invention.

FIG. 1 is an exploded perspective view of a motor 1 according to the first exemplary embodiment of the present invention. FIG. 2 is a schematic diagram illustrating a positional relationship among a magnet, yokes, and a magnetic sensor in the first exemplary embodiment.

In FIG. 1, the motor 1 includes a rotor 3 having a magnet 2, a first coil 4a, a second coil 4b, a first yoke 5a, a second yoke 5b, a first bearing 6a, a second bearing 6b, a first magnetic sensor 7a, a second magnetic sensor 7b, and a positioning cover 8.

The magnet 2 has a cylindrical shape, is divided into n segments along its outer peripheral surface (in the present exemplary embodiment n is 10 segments), and is magnetized so that S poles and N poles alternate with each other.

As illustrated in FIG. 1, the magnet 2 used in the present exemplary embodiment is provided with a skew magnetization where boundary lines of the magnetic poles (S poles and N poles) are inclined at a degree of $\alpha°$ with respect to a rotating shaft of the rotor 3.

The magnet 2 is mounted on the rotor 3 to form a rotor unit of the motor 1.

Conducting wire of the first coil 4a is wound around a bobbin 4a-1 many times so as to be coaxial with the rotating shaft of the rotor 3. Conducting wire of the second coil 4b is wound around a bobbin 4b-1 many times so as to be coaxial with the rotating shaft of the rotor 3.

The first coil 4a and the second coil 4b have roughly the same resistance and number of turns.

The first yoke 5a is formed from a soft magnetic material, and has, as a first magnetic pole member, a first magnetic pole teeth group 5a-1 including a plurality of magnetic pole teeth that face a magnetized surface of the magnet 2. In the first magnetic pole teeth group 5a-1, each of the teeth extends parallel to the rotating shaft of the rotor 3, and is excited by energizing the first coil 4a. Further, the number of teeth is desirably n/2, and in the present exemplary embodiment, the number is 5. Each of the magnetic pole teeth is arranged at equally-spaced intervals. The intervals between the magnetic pole teeth are $360/n°$ (in the present exemplary embodiment, 72°).

The second yoke 5b is formed from the soft magnetic material, and has, as a second magnetic pole member, a second magnetic pole teeth group 5b-1 including a plurality of magnetic pole teeth that face the magnetized surface of the magnet 2. In the second magnetic pole teeth group 5b-1, each of the teeth extends parallel to the rotating shaft of the rotor 3, and is excited by energizing the second coil 4b. Further, the number of teeth is desirably n/2, and in the present exemplary embodiment, the number is 5. Each of the magnetic pole teeth is arranged at equally-spaced intervals. The intervals between the magnetic pole teeth are $360/n°$ (in the present exemplary embodiment, 72°).

Further, the second magnetic pole teeth group 5b-1 is arranged with respect to the first magnetic pole teeth group 5a-1 with a predetermined phase difference. The predetermined phase difference is about $90/n°$ (in the present exemplary embodiment, 18°), which may be changed by a few degrees in order to reduce the cogging torque.

The first bearing 6a and the second bearing 6b are respectively fixed to the first yoke 5a and the second yoke 5b, and rotatably support the rotor unit.

The first magnetic sensor 7a and the second magnetic sensor 7b, which are a magnetic detection unit, detect strength of a magnetic field of, for example, a Hall element and a magnetoresistive (MR) element, and output a voltage according to the strength of the magnetic field.

The magnetic sensors 7a and 7b are arranged in the vicinity of the magnetized surface of the magnet 2, and detect the strength of the magnetic field of the facing magnet 2.

Further, the second magnetic sensor 7b detects the strength of the magnetic field generated by the magnet 2. Upon detecting that plus and minus of the signal output has switched, the second magnetic sensor 7b switches the energization direction to the second coil 4b.

Further, the magnetic sensors 7a and 7b are attached to flexible cables (not shown) for power supply and voltage output.

The positioning cover 8, which is the position adjustment unit, is formed from a non-magnetic material, and has yoke fixing grooves 8-1 for arranging the first yoke 5a and the second yoke 5b with the predetermined phase. Further, the positioning cover 8 includes guide grooves 8-2 for magnetic sensor adjustment in order to arrange the magnetic sensors 7a and 7b.

Each of the guide grooves 8-2 for magnetic sensor adjustment extends parallel to the rotating shaft of the rotor 3, so that the position of the magnetic sensors 7a and 7b can be adjusted. A width of the guide groove 8-2 for magnetic sensor adjustment is roughly the same as an external form of the magnetic sensors 7a and 7b, so that the position of the rotating direction of the magnetic sensors 7a and 7b can be determined.

The first coil 4a and the first bearing 6a are fixed to the first yoke 5a. The second coil 4b and the second bearing 6b are fixed to the second yoke 5b.

A stator unit of the motor 1 in the present exemplary embodiment is configured such that the first yoke 5a and the second yoke 5b are fixed to the yoke fixing grooves 8-1 of the positioning cover 8.

The positions of the first magnetic sensor 7a and the second magnetic sensor 7b can be adjusted in a direction of an arrow illustrated in FIG. 2 (direction parallel to the magnetic teeth) by the guide grooves 8-2 for magnetic sensor adjustment.

Both the magnetic sensors 7a and 7b are fixed to the guide grooves 8-2 for magnetic sensor adjustment after their position is adjusted by a method described below.

A drive method of the thus-configured motor 1 will now be described with reference to FIG. 3.

FIGS. 3A to 3C are diagrams illustrating a relationship among torque generated in a coil, a rotation angle of the rotor 3, and a sensor signal.

FIG. 3A is a diagram illustrating the relationship between the rotation angle of the rotor 3 and the torque generated in the first coil 4a and the second coil 4b when these coils are energized.

FIG. 3B is a diagram illustrating the relationship between the torque generated in the motor 1 when one of the first coil 4a and the second coil 4b is energized, and the rotation angle of the rotor 3. In FIG. 3B, the torque, when the first coil 4a is positively energized, is expressed as A+B0.

FIG. 3C is a diagram illustrating the output signals obtained from the first magnetic sensor 7a and the second magnetic sensor 7b.

In the motor 1 of the present exemplary embodiment, by successively switching the energization directions to the two coils 4a and 4b, a stable position of the rotor 3 is shifted and the rotor 3 is rotated. Thus, the magnetic sensors 7a and 7b must be arranged in suitable positions to drive the motor 1 efficiently.

To arrange the magnetic sensors 7a and 7b in suitable positions, the following method may be used, for example.

In the present exemplary embodiment, the first magnetic sensor 7a detects the strength of the magnetic field generated by the magnet 2 when the first coil 4a is energized. Thus, the first magnetic sensor 7a detects whether the plus and minus of the voltage, which is the signal output corresponding to the detected strength of the magnetic field, has switched.

Similarly, the second magnetic sensor 7b detects the strength of the magnetic field generated by the magnet 2 when the second coil 4b is energized in order to detect whether the plus and minus of the voltage, which is the signal output corresponding to the detected strength of the magnetic field, has switched.

In the present exemplary embodiment, to constantly produce the maximum torque corresponding to the angle of the rotor 3, the motor may be driven along the torque curve shown in bold during the two-phase energization illustrated in FIG. 3A.

Further, the first magnetic sensor 7a is arranged so that the detected signal output switches from plus to minus at an intersection P2 of torque A+B+ with A−B+.

Further, the first magnetic sensor 7a is arranged so that the detected signal output switches from minus to plus at an intersection P4 of torque A−B− with A+B−.

The second magnetic sensor 7b is arranged so that the detected signal output switches from plus to minus at an intersection P3 of torque A−B+ with A−B−.

Further, the second magnetic sensor 7b is arranged so that the detected signal output switches from minus to plus at an intersection P1 of torque A+B− with A+B+.

When the motor is driven, the first magnetic sensor 7a detects the strength of the magnetic field generated by the magnet 2. When the first magnetic sensor 7a detects a switch between plus and minus of the signal output, the energization direction to the first coil 4a is switched.

Further, the second magnetic sensor 7b detects the strength of the magnetic field generated by the magnet 2. When the second magnetic sensor 7b detects a switch between plus and minus of the signal output, the energization direction to the second coil 4b is switched.

The waveform of the sensor signal at this stage is illustrated in FIG. 3C. When an effect of magnetic interference can be ignored, the torque during two-phase energization can be obtained by combining the torque during one-phase energization illustrated in FIG. 3B. For example, by combining torque A+B0 and torque A0B+, torque A+B+ is obtained.

At the phase of the above-described intersection P2 of torque A+B+ with A−B+, the torque A+B0 during one-phase energization becomes 0. At this point, the first magnetic sensor 7a is arranged so that the signal output detected by the first magnetic sensor 7a switches from plus to minus.

More specifically, the phase of the signal output detected by the first magnetic sensor 7a is made equal to the phase of the torque curve of when only the first coil 4a is energized. Further, the phase of the signal output detected by the second magnetic sensor 7b is made equal to the phase of the torque curve of when only the second coil 4b is energized. Consequently, the magnetic sensors 7a and 7b can be arranged at their optimal positions.

Next, a method for adjusting the arrangement positions of the magnetic sensors 7a and 7b will be described.

After assembling the motor parts other than the magnetic sensors 7a and 7b, the rotor unit is stopped at a one-phase stable point by energizing only the first yoke 5a. At this stage, the first magnetic sensor 7a is positioned on a magnetized boundary of the magnet 2 so that the first magnetic sensor 7a can be arranged at its optimal position as described above.

Power is supplied to the first magnetic sensor 7a, and while checking the output signal, the position of the first magnetic sensor 7a is adjusted along the guide groove 8-2 for magnetic sensor adjustment. The position where the output signal becomes 0 V is the optimal position where the first magnetic sensor 7a should be arranged. After the position is adjusted, the first magnetic sensor 7a is fixed using an adhesive, screws, or the like. Further, only the second coil 4b is energized and adjusted in the same manner as for the first magnetic sensor 7a so that the second magnetic sensor 7b can also be arranged at its optimal position.

Figure 4:
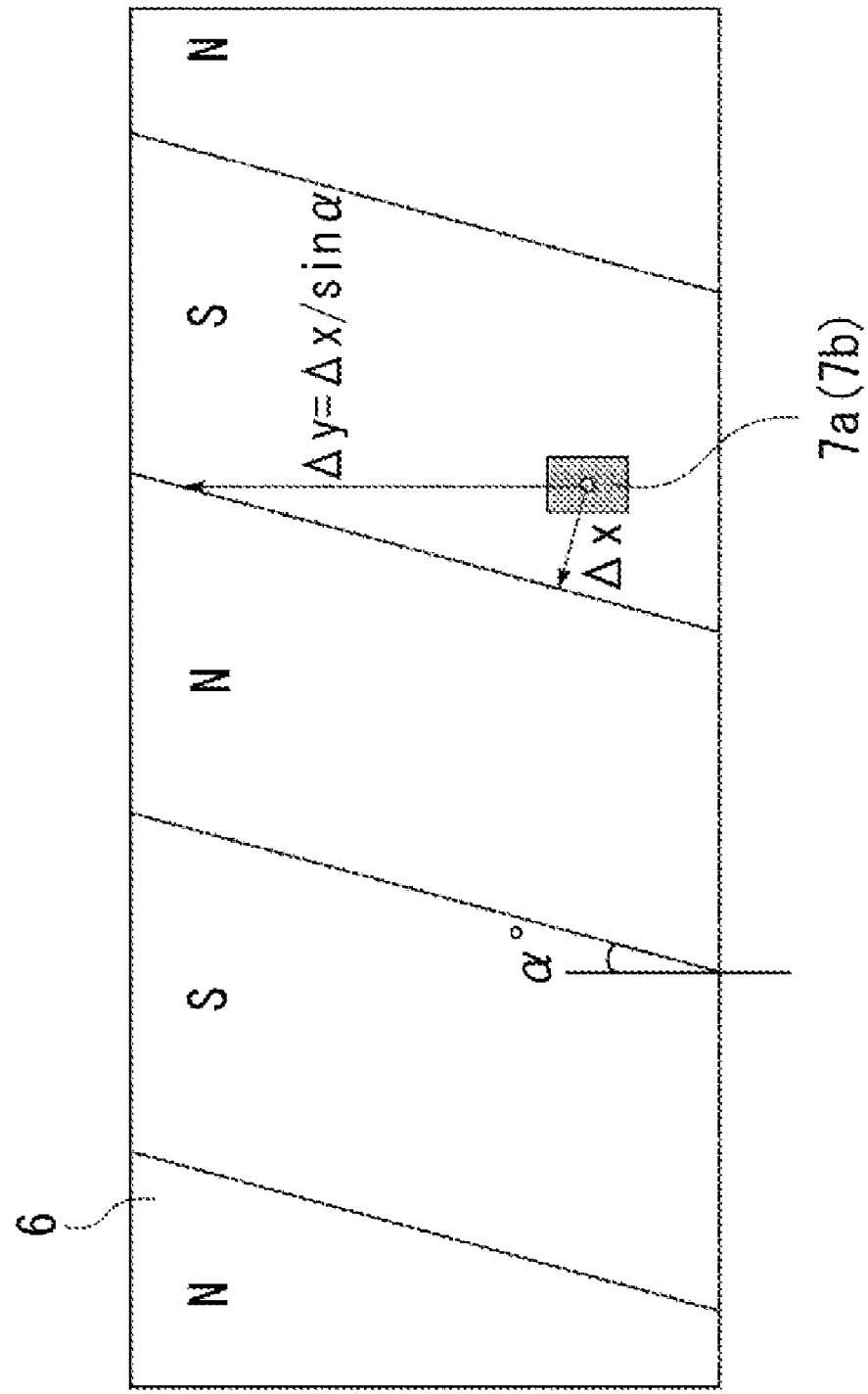
FIG. 4 is an explanatory diagram for a method for adjusting an arrangement position of the magnetic sensor in the first exemplary embodiment of the present invention.
Figure 8A:
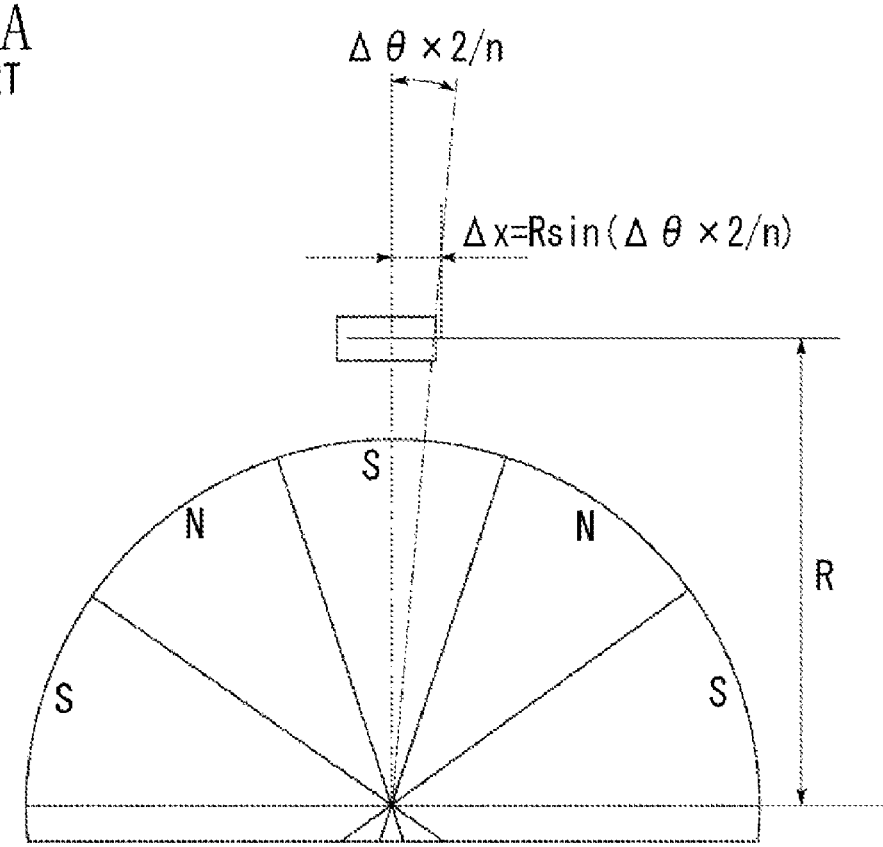
FIGS. 8A and 8B are diagrams illustrating mounting error when mounting a magnetic sensor.
Figure 8B:
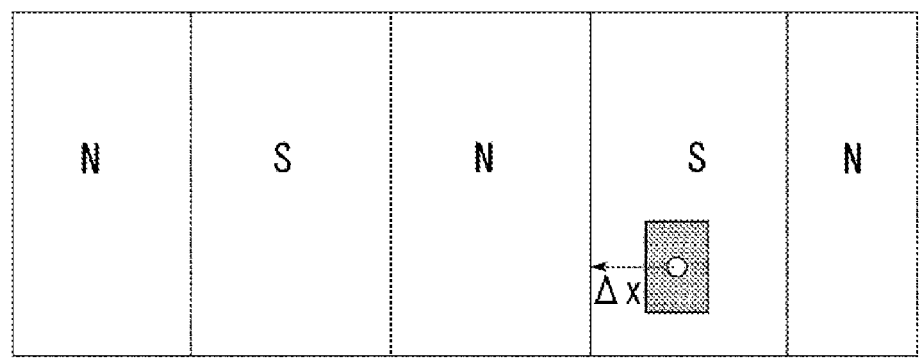
Figure 9:
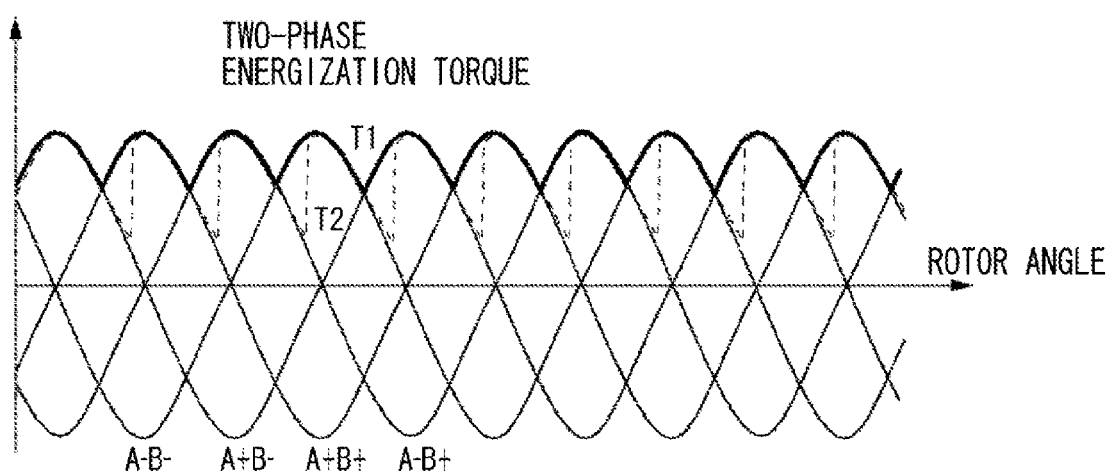
FIG. 9 is a diagram illustrating a relationship between torque generated when a constant current flows through a coil, and a rotor rotation angle.

The effects gained by performing the above-described adjustment method will be described with reference to FIGS. 4, 8A, and 8B. FIGS. 8A and 8B are diagrams for describing methods for adjusting the arrangement position of a magnetic sensor in a conventional motor. FIG. 4 is a schematic diagram for describing a method for adjusting the arrangement position of one of the magnetic sensors 7a and 7b in the present exemplary embodiment.

When the position of the magnetic sensor is adjusted as a conventional motor in an orthogonal direction with respect to the boundary of the magnetization of the magnet, as described above, a travel distance $\Delta x$ of the magnetic sensor can be expressed as $R \sin(\Delta\theta \times 2/n)$.

In contrast, when a magnetic sensor is arranged according to the method for adjusting the arrangement position of the present exemplary embodiment, the magnetic sensor travel distance $\Delta y$ is expressed as $\Delta x/\sin\alpha$. This is because while for the conventional motor, the boundary of the magnetic poles of the magnet is magnetized in the rotating shaft direction of the rotor, for the magnet 2 of the present exemplary embodiment, the boundary of the magnetic poles is magnetized at an incline of a predetermined angle with respect to the rotating shaft of the rotor 3.

For the conventional motor, fine adjustments of the position are difficult because the distance that the magnetic sensor travels in the direction perpendicular to the rotating shaft of the rotor becomes the adjustment amount.

However, for the motor 1 of the present exemplary embodiment, since the boundary of the magnetic poles is inclined, the magnetic sensor 7a or 7b is moved not only in the rotating shaft direction of the rotor 3 but also in a direction (direction for arrangement adjustment) perpendicular to the rotating shaft of the rotor 3 at the same time.

That is, even if the magnetic sensor 7a or 7b of the present exemplary embodiment is moved in the rotating shaft direction of the rotor 3 by the same travel distance as in the conventional example, the travel distance in the direction (direction for arrangement adjustment) perpendicular to the rotating shaft of the rotor 3 is smaller than that of the conventional example. As a result, finer adjustment is possible.

In the present exemplary embodiment, the number of poles n of the magnet 2 is 10 poles, the distance r from the rotating shaft of the rotor 3 to the magnetic sensor 7a or 7b is 3.0 mm, the adjustment amount $\Delta\theta$ of the magnetic sensor output signal is 10°, and the angle $\alpha$ formed between the boundary lines of the magnetic poles of the magnet 2 and the rotating shaft of the rotor is 10°.

In this case, with the method for adjusting the arrangement position of the magnetic sensor in the conventional motor, the travel distance $\Delta x$ of the magnetic sensor becomes 0.10 mm. In contrast, with the method for adjusting the arrangement position of the magnetic sensor 7a or 7b according to the present exemplary embodiment, the travel distance $\Delta y$ of the magnetic sensor 7a or 7b becomes 0.04 mm.

Therefore, the motor 1 according to the present exemplary embodiment is little affected by an error in a target adjustment amount. Thus, it becomes easy to finely adjust the sensor position.

Accordingly, the present exemplary embodiment can reduce assembly costs and improve an apparatus quality using a position adjustment mechanism that is simpler than the conventional motor.

The number of magnet poles, the distance from the rotating shaft of the rotor to the magnetic sensor, the adjustment amount of the magnetic sensor output signal, and the angle formed between the boundary lines of the magnet and the rotating shaft of the rotor are not limited to what was described above.

Further, in the present exemplary embodiment, the member for determining the phase difference between the first yoke 5a and the second yoke 5b is the same as the member for determining the position of the magnetic sensor 7a or 7b.

Generally, if an error occurs in the phase difference between the yokes, the cogging torque of the motor increases. Further, if an error occurs in the positional relationship between the yokes and the magnetic sensors, as described above, the torque waveform is deformed, and problems such as a decrease in motor efficiency and the occurrence of noise arise.

Therefore, by using the same member to determine the phase difference between yokes and to adjust the positions of the magnetic sensors as in the present exemplary embodiment, the impact of the above problems can be minimized.

Further, providing a suitable skew magnetization to the magnet is effective in reducing cogging torque. A use of a skew magnetized magnet like in the present exemplary embodiment can not only make the position adjustment of the magnetic sensor easier, but also reduce the cogging torque, so that the motor drive efficiency can be increased, and noise when the motor is driven can be decreased.

In the present exemplary embodiment, the boundary lines of the magnetic poles are inclined with respect to the rotating shaft of the rotor, and the magnetic sensors are arranged such that their movable direction is parallel to the rotating shaft of the rotor so that the magnetic sensors are adjustable in the rotating shaft direction. However, the present invention is not limited to this configuration.

The same effects can be obtained if the incline of the boundary lines of the magnetic poles with respect to the rotating shaft of the rotor is different from the incline of the movable direction of the magnetic sensors with respect to the rotating shaft of the rotor.

Second Exemplary Embodiment

The second exemplary embodiment of the present invention will be described with reference to FIGS. 5 to 7. Components which are the same as in the first exemplary embodiment are provided with the same reference numerals, and hence a description of such components is omitted.

Figure 5:
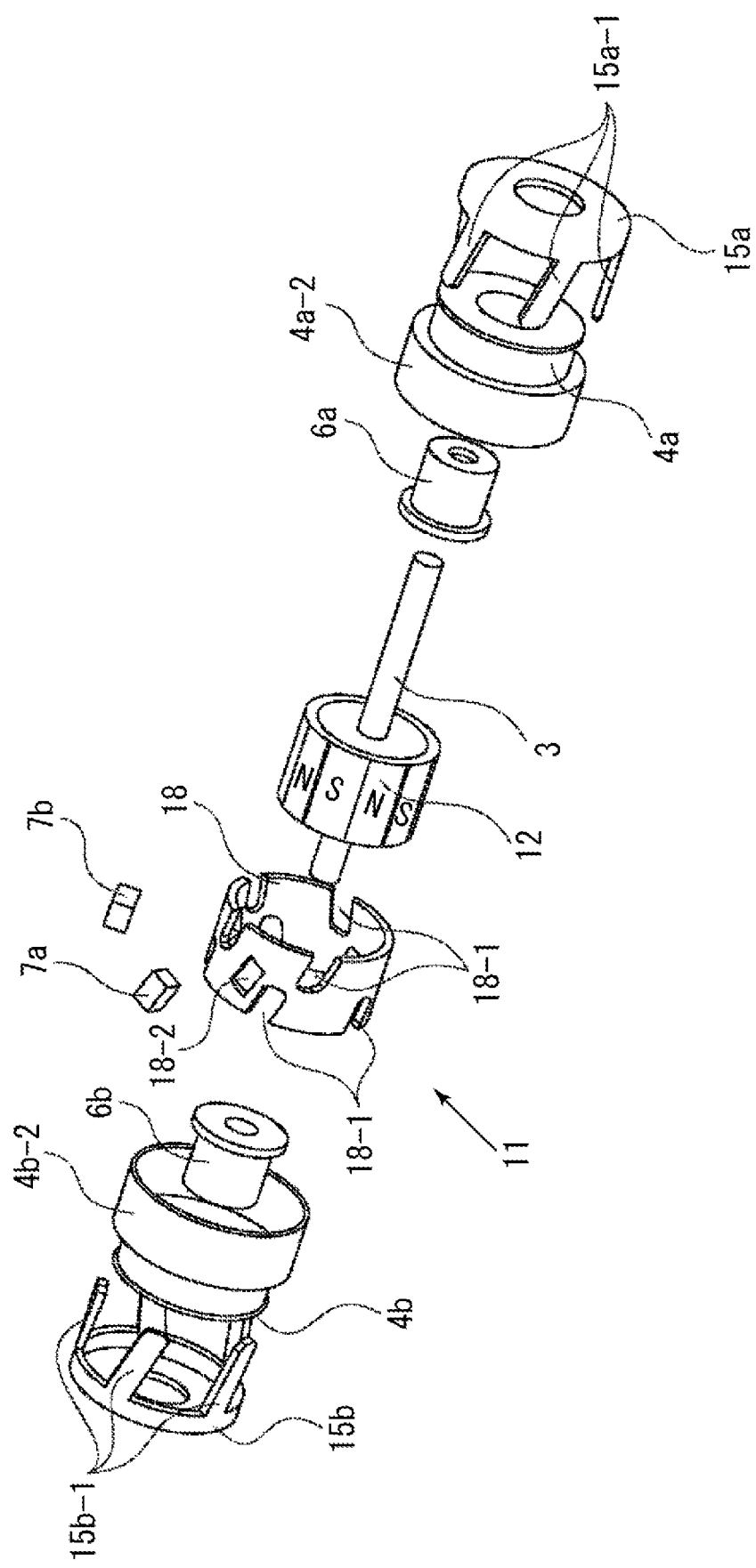
FIG. 5 is an exploded perspective view of a motor according to a second exemplary embodiment of the present invention.

FIG. 5 is an exploded perspective view of a motor 11 according to the second exemplary embodiment. In FIG. 5, the motor 11 includes a rotor 3 having a magnet 12, a first coil 4a, a second coil 4b, a first yoke 15a, and a second yoke 15b. The motor 11 also includes a first bearing 6a, a second bearing 6b, a first magnetic sensor 7a, a second magnetic sensor 7b, and a positioning cover 18.

The magnet 12 has a cylindrical shape, is divided into n segments along its outer peripheral surface (in the present exemplary embodiment, n is 10 segments), and is magnetized so that S poles and N poles alternate with each other. The difference of the magnet 12 with the magnet of the first exemplary embodiment is that the boundary lines of the magnetic poles are parallel to the rotating shaft of the rotor 3.

The magnet 12 is mounted on the rotor 3 to form a rotor unit of the motor 11.

Conducting wire of the first coil 4a is wound around a first bobbin 4a-2 a large number of times so as to be coaxial with the rotating shaft of the rotor 3. The first bobbin 4a-2 has a thread winding member and a motor cover member. The motor cover member has a hollow cylindrical shape, and can fit the positioning cover 18 into its inner side.

Conducting wire of the second coil 4b is wound around a second bobbin 4b-2 a large number of times so as to be coaxial with the rotating shaft of the rotor 3. The second bobbin 4b-2 has a thread winding member and a motor cover member. The motor cover member has a hollow cylindrical shape, and can fit the positioning cover 18 into its inner side.

The first coil 4a and the second coil 4b have roughly the same resistance and number of turns.

The first yoke 15a is formed from a soft magnetic material, and has a first magnetic pole teeth group 15a-1 which face the magnetized surface of the magnet 12.

The first magnetic pole teeth group 15a-1 has a predetermined interval with the magnet 12. Each of the teeth extends at an angle $\alpha$ with respect to the rotating shaft of the rotor 3, and is excited by energizing the first coil 4a. Further, the number of teeth is desirably n/2, and in the present exemplary embodiment, the number is 5. Each of the magnetic pole teeth is arranged at equally-spaced intervals. The intervals between the magnetic pole teeth are 360/n° (in the present exemplary embodiment, 72°).

The second yoke 15b is formed from the soft magnetic material, and has a second magnetic pole teeth group 15b-1 which faces the magnetized surface of the magnet 12.

The second magnetic pole teeth group 15b-1 has a predetermined interval with the magnet 12. Each of the teeth extends at an angle α with respect to the rotating shaft of the rotor 3, and is excited by energizing the second coil 4b. Further, the number of teeth is desirably n/2, and in the present exemplary embodiment, the number is 5. Each of the magnetic pole teeth is arranged at equally-spaced intervals. The intervals between the magnetic pole teeth are 360/n° (in the present exemplary embodiment, 72°).

Further, the second magnetic pole teeth group 15b-1 is arranged with respect to the first magnetic pole teeth group 15a-1 with a predetermined phase difference. The predetermined phase difference is about 90/n° (in the present exemplary embodiment, 18°), which may be changed by a few degrees in order to reduce the cogging torque.

The positioning cover 18 is formed from a non-magnetic material, and has a roughly cylindrical shape. The positioning cover 18 has yoke positioning grooves 18-1 for arranging the first yoke 15a and the second yoke 15b with the predetermined phase. Further, the positioning cover 18 has magnetic sensor fixing portions 18-2 for fixing the magnetic sensors 7a and 7b.

The first coil 4a and the first bearing 6a are fixed to the first yoke 15a. The second coil 4b and the second bearing 6b are fixed to the second yoke 15b.

A stator unit of the motor 11 in the present exemplary embodiment is configured such that the first yoke 15a and the second yoke 15b are fixed to the positioning cover 18 after adjusting by a method as described below.

In the first exemplary embodiment, a magnet having boundary lines of the magnetic poles inclined at the predetermined angle with respect to the rotating shaft of the rotor 3, namely a skew magnetized magnet, is used for the magnet 2; and the teeth of the first and second magnetic pole teeth groups 5a-1 and 5b-1 extend parallel to the rotating shaft of the rotor 3. The position of the magnetic sensors 7a and 7b which detect the strength of the magnetic field generated by the magnet 2 is adjusted in the rotating shaft direction of the rotor 3 so that it becomes easy to finely adjust the positions of the magnetic sensors 7a and 7b.

In contrast, in the second exemplary embodiment, a magnet having boundary lines of the magnetic poles parallel to the rotating shaft of the rotor 3 is used for the magnet 12; and the teeth of the first and second magnetic pole teeth groups 5a-1 and 5b-1 extend inclined at the predetermined angle with respect to the rotating shaft of the rotor 3.

The position of the magnetic sensors 7a and 7b which detect the strength of the magnetic field of the magnet 12 is adjusted in the same direction as the incline of the first and second magnetic pole teeth groups 15a-1 and 15b-1 with respect to the rotating shaft of the rotor 3 so that the same effects as in the first exemplary embodiment can be obtained.

Figure 6:
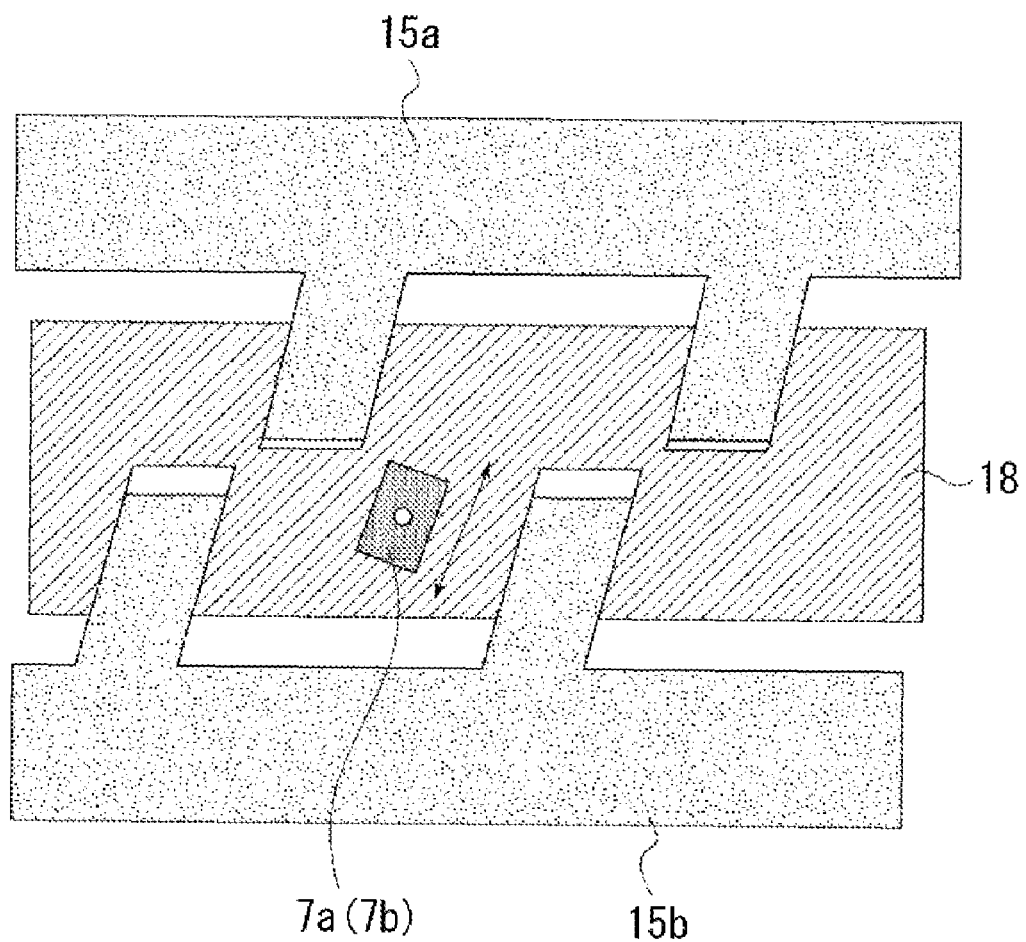
FIG. 6 is a schematic diagram illustrating a positional relationship among a positioning cover, yokes, and a magnetic sensor in the second exemplary embodiment of the present invention.

FIG. 6 is a diagram illustrating the positional relationship among the positioning cover 18, the yokes 15a and 15b, and the magnetic sensor 7a or 7b in the second exemplary embodiment.

As illustrated in FIG. 6, the positioning cover 18, the first yoke 15a, and the second yoke 15b can be adjusted in the rotating shaft direction of the rotor 3.

The magnetic sensor 7a or 7b can be movably adjusted, along with the positioning cover 18, in the same direction as the incline of the first and second magnetic pole teeth groups 15a-1 and 15b-1 with respect to the rotating shaft of the rotor 3. More specifically, the positioning cover 18 enables the positioning of the yokes 15a and 15b in the motor rotating direction and the positional adjustment of the magnetic sensor 7a or 7b with a single part. As a result, an increase in the number of parts can be avoided.

Figure 7:
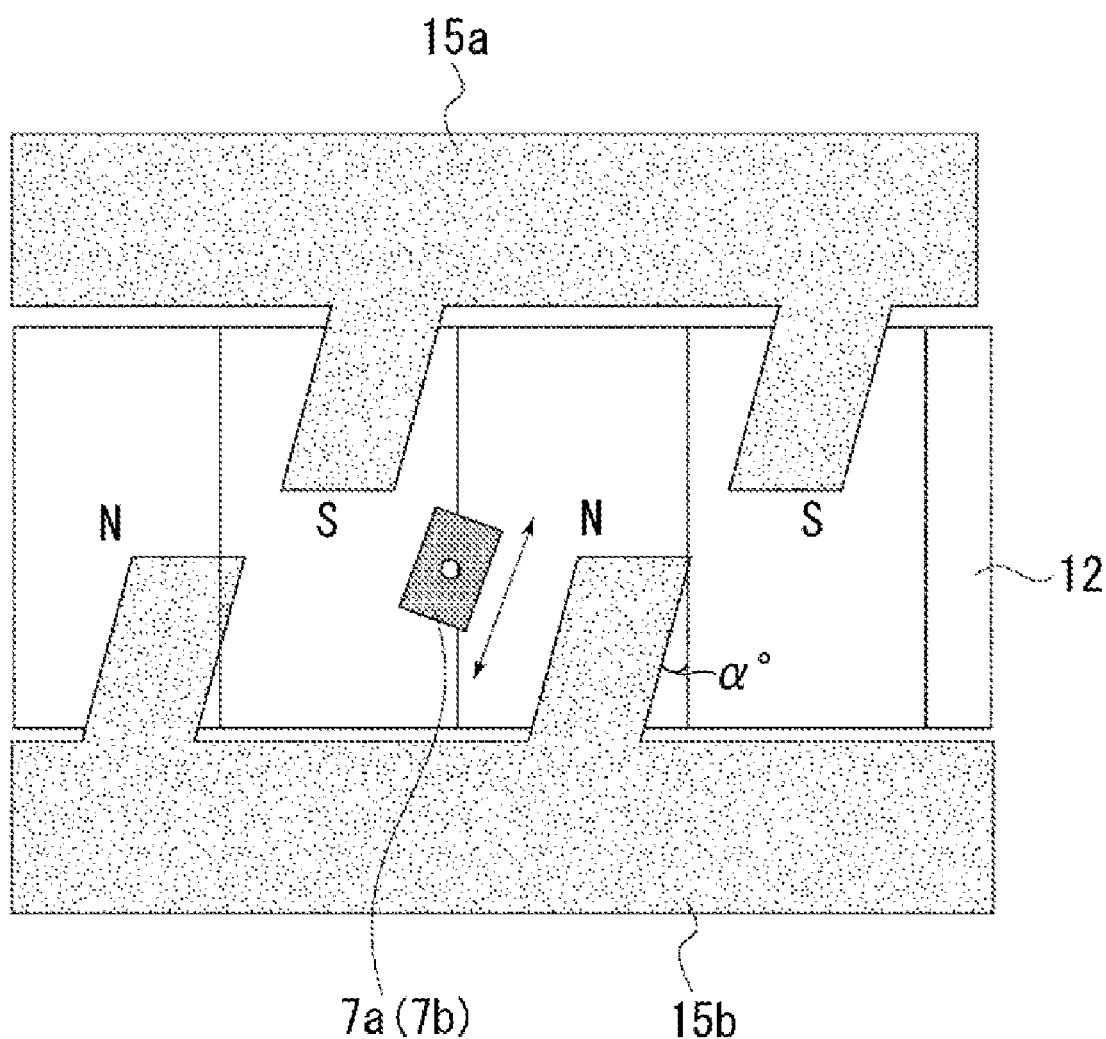
FIG. 7 is a schematic diagram illustrating the positional relationship among a magnet, yokes, and a magnetic sensor in the second exemplary embodiment of the present invention.

FIG. 7 is a diagram illustrating the positional relationship among the magnet 12, the yokes 15a and 15b, and the magnetic sensor 7a or 7b in the second exemplary embodiment. To simplify the description, the positioning cover 18 is not shown. Like the first exemplary embodiment, in the present exemplary embodiment, the magnetic sensor 7a or 7b is adjustable by an angle α with respect to the boundary lines of the magnetic poles of the magnet 12.

Thus, in the present exemplary embodiment, by the magnetic sensors 7a and 7b are integrally and movably fixed to the positioning cover 18, and the positioning cover 18 can be movably adjusted in the direction parallel to the rotating shaft of the rotor 3 so that the same effects as in the first exemplary embodiment can be obtained.

While in the present exemplary embodiment, the boundary lines of the magnetic poles of the magnet 12 are parallel to the rotating shaft of the rotor 3, the present invention is not limited to this configuration.

The same effects can be obtained if the incline of the magnetic pole teeth groups 15a-1 and 15b-1 with respect to the rotating shaft of the rotor 3 and the incline of the boundary lines of the magnetic poles of the magnet 12 with respect to the rotating shaft of the rotor 3 are different when the magnetic sensors 7a and 7b are fixed to the positioning cover 18.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-239305 filed Sep. 14, 2007, which is hereby incorporated by reference herein in its entirety.

What is claimed is:

1. A motor driving apparatus comprising:
   a rotatable rotor having a magnet that is divided into a plurality of segments along an outer peripheral surface, the magnet being magnetized so that S poles and N poles alternate with each other;
   a first magnetic pole member configured to face a magnetized surface of the magnet and extend;
   a second magnetic pole member configured to face the magnetized surface of the magnet and extend;
   a first coil configured to excite the first magnetic pole member;
   a second coil configured to excite the second magnetic pole member;
   a position adjustment unit configured to arrange the first magnetic pole member and the second magnetic pole member with a predetermined phase; and
   a magnetic detection unit movably arranged on the position adjustment unit and configured to detect a magnetic field strength generated by the magnet,
   wherein an angle between boundary lines of the magnetic poles of the magnet and a movable direction of the magnetic detection unit is larger than 0-degree and smaller than 90-degrees.

2. The motor driving apparatus according to claim 1, wherein the boundary lines of the magnetic poles of the magnet are inclined at a predetermined angle with respect to the rotating shaft of the rotor, and the magnetic detection unit is movable in a direction parallel to the rotating shaft of the rotor.

3. A motor driving apparatus comprising:
   a rotatable rotor having a magnet that is divided into a plurality of segments along an outer peripheral surface, is the magnet being magnetized so that S poles and N poles alternate with each other;

a first magnetic pole member configured to face a magnetized surface of the magnet and extend;

a second magnetic pole member configured to face the magnetized surface of the magnet and extend;

a first coil configured to excite the first magnetic pole member;

a second coil configured to excite the second magnetic pole member;

a position adjustment unit configured to arrange the first magnetic pole member and the second magnetic pole member with a predetermined phase, the position adjustment unit being movable in a direction parallel to a rotating shaft of the rotor; and a magnetic detection unit integrally and movably arranged on the position adjustment unit and configured to detect a magnetic field strength generated by the magnet, wherein an angle between extending directions of the first magnetic pole member and the second magnetic pole member, and boundary lines of the magnetic poles of the magnet is lager than 0-degree and smaller than 90-degrees.

4. The motor driving apparatus according to claim 3, wherein the first magnetic pole member and the second magnetic pole member are inclined at a predetermined angle with respect to the rotating shaft of the rotor, and the boundary lines of the magnetic poles of the magnet are parallel to the rotating shaft of the rotor.

5. A motor driving apparatus comprising:
a rotatable rotor having a magnet that is divided into a plurality of segments along an outer peripheral surface, is the magnet being magnetized so that S poles and N poles alternate with each other;

a first magnetic pole member configured to face a magnetized surface of the magnet and extend;

a second magnetic pole member configured to face the magnetized surface of the magnet and extend;

a first coil configured to excite the first magnetic pole member;

a second coil configured to excite the second magnetic pole member;

a magnetic detection unit configured to detect a magnetic field strength generated by the magnet; and a position adjustment unit configured to movably arrange the magnetic detection unit, wherein boundary lines of the magnetic poles of the magnet are different from a direction of a rotating shaft of the rotor, wherein a movable direction of the magnetic detection unit is parallel to the direction of the rotating shaft of the rotor, and wherein an angle between boundary lines of the magnetic poles of the magnet and a movable direction of the magnetic detection unit is larger than 0-degree and smaller than 90-degrees.

6. The motor driving apparatus according to claim 5, wherein an extending direction of the first magnetic pole member and the second magnetic pole member is different from a boundary line direction of the magnetic poles of the magnet and the movable direction of the magnetic detection unit is parallel to the extending direction of the first magnetic pole member and the second magnetic pole member.

7. A motor driving apparatus comprising:
a rotatable rotor having a magnet that is divided into a plurality of segments along an outer peripheral surface, is the magnet being magnetized so that S poles and N poles alternate with each other;

a first magnetic pole member configured to face a magnetized surface of the magnet and extend;

a second magnetic pole member configured to face the magnetized surface of the magnet and extend;

a first coil configured to excite the first magnetic pole member;

a second coil configured to excite the second magnetic pole member;

a magnetic detection unit configured to detect a magnetic field strength generated by the magnet; and a position adjustment unit configured to movably arrange the magnetic detection unit, the magnetic detection unit being movable in a direction parallel to a rotating shaft of the rotor, wherein an extending direction of the first magnetic pole member and the second magnetic pole member is different from a boundary line direction of the magnetic poles of the magnet, and wherein an angle between boundary lines of the magnetic poles of the magnet and a movable direction of the magnetic detection unit is larger than 0-degree and smaller than 90-degrees.

8. A motor driving apparatus comprising:
a rotatable rotor having a magnet that is divided into a plurality of segments along an outer peripheral surface, is the magnet being magnetized so that S poles and N poles alternate with each other;

a first magnetic pole member configured to face a magnetized surface of the magnet and extend;

a second magnetic pole member configured to face the magnetized surface of the magnet and extend;

a first coil configured to excite the first magnetic pole member;

a second coil configured to excite the second magnetic pole member;

a magnetic detection unit configured to detect a magnetic field strength generated by the magnet; and a position adjustment unit configured to movably arrange the magnetic detection unit, the magnetic detection unit being movable in a direction parallel to an extending direction of the first magnetic pole member and the second magnetic pole member, wherein the extending direction of the first magnetic pole member and the second magnetic pole member is different from a boundary line direction of the magnetic poles of the magnet, and wherein an angle between boundary lines of the magnetic poles of the magnet and a movable direction of the magnetic detection unit is larger than 0-degree and smaller than 90-degrees.

* * * * *